(12) United States Patent
Koller et al.

(10) Patent No.: US 10,143,146 B2
(45) Date of Patent: Dec. 4, 2018

(54) HEAT DISTRIBUTION APPARATUS AND METHOD

(71) Applicant: HEAT RANGER LIMITED, Hamilton (NZ)

(72) Inventors: Bruce George Koller, Wellington (NZ); Fredrick William Phillips, Hamilton (NZ); Nigel Robert Green, Leeston (NZ); Richard John Roake, Hamilton (NZ)

(73) Assignee: Heat Ranger Limited, Hamilton (NZ)

( * ) Notice: Subject to any disclaimer, the term of this patent is extended or adjusted under 35 U.S.C. 154(b) by 384 days.

(21) Appl. No.: 14/898,350

(22) PCT Filed: Jun. 13, 2014

(86) PCT No.: PCT/NZ2014/000118
§ 371 (c)(1),
(2) Date: Dec. 14, 2015

(87) PCT Pub. No.: WO2014/200367
PCT Pub. Date: Dec. 18, 2014

(65) Prior Publication Data
US 2016/0128284 A1   May 12, 2016

(30) Foreign Application Priority Data
Jun. 14, 2013 (NZ) ........................................ 611984

(51) Int. Cl.
*A01G 13/06* (2006.01)
*F24H 3/04* (2006.01)
*A01G 15/00* (2006.01)

(52) U.S. Cl.
CPC ............. *A01G 13/06* (2013.01); *A01G 15/00* (2013.01); *F24H 3/0488* (2013.01)

(58) Field of Classification Search
CPC ...... A01G 13/06; A01G 15/00; F24H 3/0488; F24H 3/025; F24H 3/006; F23D 14/28
See application file for complete search history.

(56) References Cited

U.S. PATENT DOCUMENTS 1,317,959 A    10/1919  Cobb
2,641,085 A *   6/1953  Robinson ............... A01G 13/06
                                                            126/59.5
(Continued)

FOREIGN PATENT DOCUMENTS

FR    2787290 A1    6/2000
JP    2542626 B2   10/1996
(Continued)

OTHER PUBLICATIONS

International Search Report—PCT/NZ2014/000118 dated Nov. 19, 2014.
International Preliminary Report on Patentability issued in Application No. PCT/NZ2014/000118, dated Oct. 21, 2015.

*Primary Examiner* — David J Laux
(74) *Attorney, Agent, or Firm* — Studebaker & Brackett PC

(57) ABSTRACT

In one aspect the invention provides a heating apparatus adapted to modify local climatic conditions which includes a base arranged to support the heating apparatus on a support surface. An inlet stage is associated with the base and a mixer stage connected on top of the inlet stage. At least one outlet nozzle is connected to the mixer stage, with the outlet nozzle or nozzles being adapted to rotate relative to the base. At least one heating element is located inside the mixer stage, and an impeller is arranged to drive air through the inlet stage into the mixer stage and out at least one outlet nozzle, where the mixer stage defines an air flow path which elevates air drawn through the mixer stage.

17 Claims, 7 Drawing Sheets

(56) References Cited

U.S. PATENT DOCUMENTS

| | | | | |
|---|---|---|---|---|
| 2,655,764 | A | * | 10/1953 | Watkins ............ A01G 13/06 126/59.5 |
| 2,658,308 | A | * | 11/1953 | Fowler, Jr. ......... A01G 13/06 126/59.5 |
| 2,712,714 | A | * | 7/1955 | McGee ............. A01G 13/06 47/2 |
| 2,966,763 | A | * | 1/1961 | Ferrell ............. A01G 13/06 47/2 |
| 3,166,867 | A | * | 1/1965 | Van Cleave ........ A01G 13/06 47/2 |
| 3,796,209 | A | * | 3/1974 | Luft ............... A01G 13/06 126/59.5 |
| 3,982,524 | A | * | 9/1976 | Diggs .............. A01G 13/06 126/59.5 |
| 4,513,529 | A | * | 4/1985 | Reich .............. A01G 13/06 47/2 |
| 5,497,633 | A | | 3/1996 | Jones et al. |
| 6,129,078 | A | * | 10/2000 | Moulder ............ F24C 3/14 126/24 |
| 6,347,625 | B1 | * | 2/2002 | Hill ............... A01G 13/06 126/59.5 |
| 2009/0120925 | A1 | | 5/2009 | Lasko |
| 2012/0216985 | A1 | | 8/2012 | Tai et al. |

FOREIGN PATENT DOCUMENTS

| | | |
|---|---|---|
| JP | 2009-014241 A | 1/2009 |
| KR | 10-2010-0053281 A | 5/2010 |

\* cited by examiner

HEAT DISTRIBUTION APPARATUS AND METHOD

FIELD OF THE INVENTION

The invention relates to a heat distribution apparatus and a method of operating such an apparatus to distribute heat within an area. In preferred embodiments the invention may be used in horticultural applications to control or modify the climatic conditions experienced by a crop.

BACKGROUND OF THE INVENTION

In various situations there is a need to distribute heat in outdoor areas. For example, in horticultural applications crop yields can be devastated by frost damage experienced at the wrong time of a growing cycle. Heavy rainfall and water sitting on the skin of a fruit can also impact on the quality of the produce generated by a grower. Crop yields are also dependent on successful pollination, with ambient temperatures having a role to play in this process with various crops.

Some attempts have been made to control the temperature experienced inside orchards and other similar crops. One technique currently used is the distribution of large numbers of localised heating devices or pots over the orchard floor. However, these stationery heat sources only distribute heat very locally and with a limited lateral extent. This approach requires a large number of individual heat sources to be laid out and activated over the extent of the orchard, and then subsequently collected again after the weather improves.

An alternative approach is to tow a heat source connected to a fan through an orchard. Although this approach does not require large number of individual heat pots to be deployed and collected, it does require a driver to continuously run a vehicle over and through the orchard—potentially through the early hours of the morning when frost risk is at its greatest. Furthermore, these towed heating systems again have a limited ability to distribute warm air laterally and generally only provide a narrow swathe through the orchard with little persistence. If the heat is too great close to the plants it can damage the crop. With lack persistence the heater needs to operate over a repeating track that returns within about four minutes which severely limits the area that a machine can cover effectively.

In some circumstances a temperature inversion may occur in the air surrounding an orchard. In these circumstances an upper warm air layer forms above the orchard while colder air is resident in and on the plants. Helicopters and wind turbines had previously been used to force the warm air above the orchard down into the plants, and although this approach is effective in preventing frost and generally raising orchard air temperatures, is also expensive in terms the cost of machinery required and the energy consumed by this machinery. Furthermore, this approach generates a significant amount of noise at time periods where local residents may be sleeping.

It would therefore be of advantage to have an improved heat distribution apparatus and method of operating same which addressed any or all of the above issues. A heat distribution apparatus and method of operating same which provided the public with at least an alternative choice would also be of advantage. Improvements over the prior art which allow for the distribution of warm air in or above the canopy of an orchard would also be of advantage, as would improvements which allowed for control of the volume and temperature of air distributed to various sections of an orchard.

DISCLOSURE OF THE INVENTION

According to one aspect of the present invention there is provided a heating apparatus which includes a base arranged to support the heating apparatus on a support surface an inlet stage associated with the base, and a mixer stage connected on top of the inlet stage, and at least one outlet nozzle connected to the mixer stage, said outlet nozzle or nozzles being adapted to rotate relative to the base, and at least one heating element located inside the mixer stage, and an impeller arranged to drive air through the inlet stage into the mixer stage and out at least one outlet nozzle, wherein the mixer stage defines an air flow path which elevates air drawn through the mixer stage.

The present invention is arranged to provide both an improved heating apparatus in combination with a method of operating a heating apparatus. Reference in general throughout the specification will be made predominantly to the invention providing a heating apparatus, but those skilled in the art will appreciate that an associated method of operating a heating apparatus is also within the scope of the invention.

Reference in general throughout this specification will also be made to the invention being used to modify the climatic or environmental conditions locally within an orchard or other equivalent horticultural crop. In particular embodiments it is envisioned that the invention may find particular utility in frost protection applications. In other instances the invention may be used to dry a horticultural crop through a combination of increased air speeds and temperature. In yet other instances the invention may be used to promote insect pollination of a horticultural crop by optimising local temperatures and air speeds. Again however those skilled in the art will appreciate there are other applications also envisioned for the invention and references to its use in horticultural applications should not be seen as limiting.

For example, in some instances the invention may be used to clear flog. In particular the invention may be used to clear airport runways of fog. In yet other embodiments the invention may be used to combat problems other than frost by heating a target area. For example, in some instances the invention may be used to prevent ice formation in a target area, as would be beneficial to aircraft on the ground in an airport environment.

In further embodiments the invention may be employed to provide heated deflection airflows used to disrupt, disperse or to divert strong winds blowing through an area. The heat generated by the invention can be used to speed and elevate airflows and in some cases to increase range. In these situations a nozzles can be set at a fixed vector angle to break up and disperse strong wind events that would otherwise cause excessive buffeting and fruit loss from a crop. The addition of heat to the airflows generated by the invention also adds to the effectiveness of this activity and increase the distance of a downwind protection zone. As the invention is used to provide elevated heated air flows, the heated air generated can be distributed above a crop or canopy—preventing vegetation interference effects impacting on the range of the airflow.

The heating apparatus provided by the invention includes a base used to support and locate the apparatus on a support surface. Those skilled in the art will appreciate that the particular application in which the invention is used will dictate the form or arrangement of the support surface. For example, in embodiments where the invention is used in an orchard, a support surface may simply be a patch of ground within or in proximity to the orchard. In other alternative embodiments a support surface may take the form of a platform, such as for example a trailer bed.

In a preferred embodiment a base may define a plurality of support legs.

In a preferred embodiment at least one support leg includes hollow portions which enclose at least one utility supply line. In a further preferred embodiments a support leg encloses a heating element fuel supply line, and/or an electricity supply line.

In a preferred embodiment the exterior surfaces of the support legs define aerofoil forms. These forms can assist in reducing turbulence in the air flow provided to the inlet stage.

In a further preferred embodiment the length of each of the legs provided in the base may be dynamically adjusted. In such embodiments the base legs may be telescoping or otherwise collapsible, allowing a drive system such as a hydraulic ram or a stepper motor to adjust the relative length of each leg as the invention operates. As discussed further below this characteristic of the invention can allow its performance and behaviour to be modified to suit the characteristics of the region in which it is used.

The invention also includes an inlet stage connected or fixed to the base. The inlet stage defines one or more apertures used to draw air into an upper mixer stage of the apparatus. In further preferred embodiments the inlet stage may define a low turbulence input form, smoothing inlet air flows and mitigating turbulence effects for cool air passing through to the invention's mixer stage.

The invention includes a mixer stage connected to the inlet stage, where the mixer extends above the inlet stage. Preferably the mixer stage is connected on top of the inlet stage to maximise the elevation obtained by air heated in accordance with the invention. The mixer stage defines an air flow path which elevates air drawn from the vicinity the base, and facilitates distribution of elevated heated air over and preferably above the height of at least the mixer stage.

The present invention also includes at least one heating element. A heating element provided with the invention is arranged to heat cool air drawn through the inlet stage and supplied to the mixer stage.

In a preferred embodiment the invention includes a single heating element only. A single heating element can be used effectively in a number of instances to provide all the heat required by the invention. Reference in general throughout this specification will also be made to the invention including a single heating element only, while those skilled in the art will appreciate that other arrangements of the invention are also envisioned and within its scope.

In a preferred embodiment a heating element may be provided by a hydrocarbon gas burner formed with a ring shape, where a number of gas outlets are deployed along the perimeter of this ring. These ring gas burners can be used to evenly distribute heat within the confines of a mixer stage.

In a preferred embodiment the heating element may be located centrally in the lower or bottom section of the mixer stage. This location for the heating element allows it to supply the heat it generates directly to all the air delivered to the mixing stage. Again however in alternative embodiments a heating element may be located in other positions, such as for example in the upper regions of the inlet stage, or as a stand alone intermediate component sited between the inlet stage and the mixing stage.

In a preferred embodiment the invention includes a plurality of mounting arms used to mount a heater element within the mixer stage, at least one mounting arm enclosing a supply fuel line connected to the heating element.

The present invention also includes an impeller arranged to drive air through the inlet stage into the mixer stage and out through at least one outlet nozzle. This impeller is located adjacent to the inlet stage and below any heating elements employed by the invention. This arrangement and positioning of the heating element ensures that the impeller works efficiently, pushing against the denser cooler air found below a heating element.

In a preferred embodiment the impeller may be located adjacent to the inlet stage and below the heating element or elements provided in the invention.

In a further preferred embodiment where a single heating element is located in the bottom section of the mixing stage the impellor may also be located in the bottom section of the mixing stage below the heating element. Again however those skilled in the art will appreciate that in a variety of embodiments other arrangements of these components may be provided in the mixing stage, the inlet stage or as stand-alone intermediate components.

The present invention includes at least one outlet nozzle connected to the mixer stage and arranged to accelerate and exhaust the air present in the mixer stage out over the upper or elevated regions of an area. In a further preferred embodiment an outlet nozzle may project upwards from an upper region of the mixing stage and then terminate in an angled or elbow section or T section to distribute heated air laterally away from the top of the heating apparatus.

A nozzle provided in accordance with the invention is arranged to rotate relative to the base. The rotational motion imparted to a nozzle allows the invention to distribute heated air in a range of directions, and preferably over an entire 360° lateral range around the base of the invention. In other embodiments a nozzle may be arranged to rotate or reciprocate over a lateral arc of less than 360°.

Those skilled in the art will appreciate that various mechanisms may be used in a number of embodiments to provide for rotation of a nozzle. For example, in one preferred embodiment the top section of the mixer stage used to mount a nozzle may be adapted to rotate about a central vertical axis. A drive system such as an electric motor or combustion engine may be employed to rotate an axle connected to this upper region of the mixer stage to therefore rotate a nozzle. Alternatively, in other embodiments the top section of the mixer stage may be rotated by the reaction force applied by air exhausted laterally from a nozzle or nozzles.

In a preferred embodiment an outlet nozzle includes at least one flow stabilization fin. Preferably a plurality of these fins may be provided to stabilize air flows exiting the nozzle.

In a preferred embodiment the invention also includes a controller arranged to issue control signals to various other components to modify the behaviour or performance of the invention. For example, in one embodiment where the rotation of nozzles is driven by an electric motor or internal combustion engine, a controller can be used to adjust the speed of the engine or motor and hence rate of rotation or reciprocation of a nozzle. In such cases the controller may adjust both the overall rotation period for the nozzle, in addition to the rotational speed of the nozzle when facing at a specific angle or orientation. Furthermore such a controller may also have the capacity to adjust the heat output of a heating element provided with the invention, preferably through controlling the flow rate of fuel to the heating element.

In a further preferred embodiment a controller used with the invention may be programmable to adjust the behaviour of the invention depending on the characteristics of the area in which the invention is to distribute heated air. In such embodiments the controller may—for example—be programmed to take into account irregularities in the layout, dimensions or boundaries of an area to be heated, slowing the rate of rotation of nozzles and potentially increasing the heat output of a heating element when a nozzle is directed towards the farthest boundary of this area, and speeding rotation of nozzles or reducing heat output when a nozzle faces a closer boundary. The controller may therefore operate to generate a stream of heated air which reaches the boundaries of an irregular target area to be heated.

As referenced above in some embodiments of the base may also be provided with legs which can have their length dynamically adjusted. When the invention is provided with this form of base leg the controller may also be used to adjust the tilt or angle of a nozzle to take into account undulations in ground height in various regions of the area being heated. These adjustment can be undertaken by the controller being used to dynamically adjust the length of at least one support leg used to form the base. For example, in one embodiment the controller may act to tilt a nozzle downwards when pointed in directions which face low lying ground.

Those skilled in the art will appreciate that the provision of such a programmable controller provides the invention with a significant degree of flexibility in how it can operate when used to distribute heated air in a range of different types of terrain and in areas with irregular boundaries. This controller may also—for example—allow nozzles to be rotated through a full 360° range of motion, or alternatively may reciprocate the motion of nozzles over a fixed arc of less than 360°.

In one preferred embodiment the present invention may include two outlet nozzles. These nozzles may be located opposite one another on the top or upper region of the mixing stage, with each nozzle pointing in the opposite direction to the other. In this arrangement the forces applied to the mixing stage by heated air exhausted from the nozzles contribute to any force used to rotate the nozzles relative to the base.

Reference in general is also be made throughout this specification to invention including two outlet nozzles. Again however those skilled in the art should appreciate that other numbers of outlet nozzles—from one in isolation to three or more—may also be provided in accordance with other embodiments of invention.

For example, in one alternative embodiment the invention may include a single nozzle only. In this case all the heat to be provided will be exhausted in one direction only at one time, allowing a controller provide with the invention to effectively target particular regions of the area to be heated.

In a preferred embodiment the mixer stage defines an internal mixer chamber. This mixer chamber is used to slow air flows through the mixer stage to allow the heat provided to circulate and mix through the cooler air supplied from the inlet stage. A nozzle or nozzles deployed above the mixer chamber can then be used to accelerate the mixed heated air and exhaust it out laterally from the invention. A mixer chamber provided with the invention therefore has a width or diameter which is at least greater than the width or diameter of the inlet stage, and which is significantly greater than the width or diameter of the entrance to any nozzle provided by the invention.

In a preferred embodiment where the invention is provided with a programmable controller, this controller may be arranged to receive a set of control instructions, or to generate these control instructions directly when provided access to environmental sensor data related to the area to be heated. This set of control instructions can be used to dictate the operational behaviour of the invention when facing particular directions within an area to be heated.

For example in some embodiments the invention's controller may linked to and receive information from a network of temperature, humidity and/or wind sensors deployed within the target area to be heated.

In a further preferred embodiment information sourced from this network of sensors can be transmitted to the invention's controller in real time where it is processed by the controller to generate a set of control instructions. These control instructions may be used to automatically adjust the variable outputs of the invention to optimise performance and protection levels for the area to be heated.

Reference in general throughout this specification will also be made to the invention receiving environmental sensor data and processing this data directly to generate a set of control instructions. However, those skilled in the art should appreciate that in other embodiments a set of control instructions may be generated independent of the apparatus of the invention—where the generated controls instructions are subsequently supplied to the controller of the invention.

This site specific environmental data can also be recorded in a variety of embodiments to enable the accumulated data from a range of climatic events to be compared against predictive models. This comparison can be made to fine tune and adjust the control instructions generated against actual historical performance. In particular embodiments control instructions can be generated using at least one predictive model.

The ability to regulate the rotational speed within each sector of the circle within an overall revolution speed also allows a controller provided by the invention to extend or recall the distance of the major vortices induced by its operation to create effective squared or rectangular block coverage patterns. This means that the controller can be used to heat rectangular or irregular areas by producing eddy patterns to achieve crop coverage areas essentially equivalent to circular areas. Management of the vortices or eddy patterns is an important ingredient for maximising the effective coverage in non-circular crop and shelter belt configurations.

The present invention may provide many potential advantages over the current prior art.

The arrangement of the invention's base and inlet stage, mixer stage and nozzles is used to elevate air drawn through the invention and subsequently exhausted by a nozzle or nozzles. The air flow path defined by the mixer stage raises the height of this air, allowing a nozzle to distribute heated air horizontally across an area. In embodiments where the invention is used in horticultural applications this aspect of the invention allows a layer of heated air to be distributed over the top of a crop or orchard, thereby acting as protection against frost damage. The same approach can also be used to dry surface water on the skin of fruit or to increase air temperatures in the canopy when pollination is underway.

In various embodiments the invention may also include a controller which can dynamically adjust the behaviour of the invention depending on the characteristics of the area to be heated. The rate of rotation of the invention's nozzles may be slowed when facing the farthest boundary of this area, and the heat output of the invention may also be increased at this stage. Provision is also made in a variety of embodiments for the angling or tilting of nozzles when facing particular areas of undulating terrain in the area to be heated.

In a variety of embodiments the invention also provides an internal mixing chamber within its mixing stage, where the dimensions of this chamber ensure that air flows are slowed to allow effective mixing of cool air with the heat provided by a heating element. A nozzle provide with the invention can then be used to again accelerate airflows and exhaust heated air at much greater speeds to maximise the range over which the invention can provide a heating effect.

Unlike other prior art techniques, the invention does not rely on the existence of a natural inversion layer to function. The invention can be used to create it's own inversion layer by adjusting the heat and airflow in exhausted in relation to local conditions that exist at the time of any adverse temperature event.

The present invention also acts to elevate and distribute warmed air above a crop. This characteristic allows the warmed air to achieve greater distance from the apparatus of the invention and hence act over a large area. This may be contrasted with prior art systems which direct warmed air close to the ground, or under or through a crop.

BRIEF DESCRIPTION OF THE DRAWINGS

Additional and further aspects of the present invention will be apparent to the reader from the following description of embodiments, given in by way of example only, with reference to the accompanying drawings in which:

FIG. 1 shows a perspective view of the heat distribution apparatus of FIG. 1.

Further aspects of the invention will become apparent from the following description of the invention which is given by way of example only of particular embodiments.

BEST MODES FOR CARRYING OUT THE INVENTION

Figure 4:
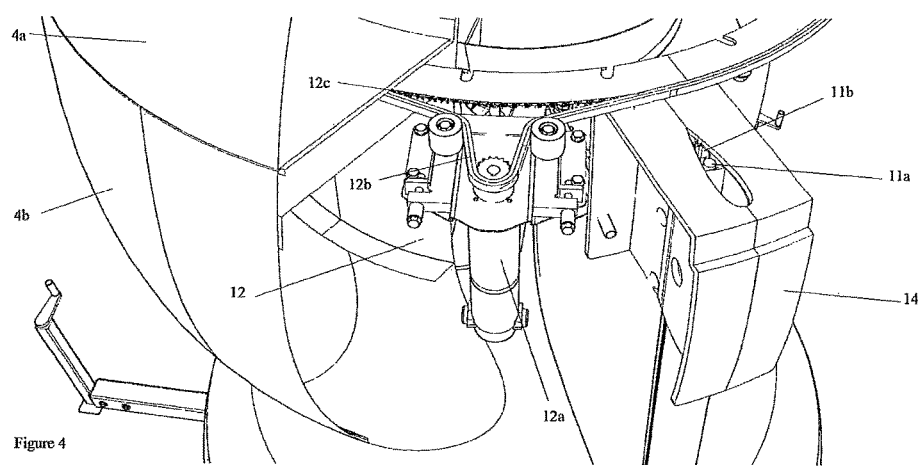
FIG. 4 shows an enlarged cut away section view of a drive system integrated into the heat distribution apparatus of FIG. 1.
Figure 5:
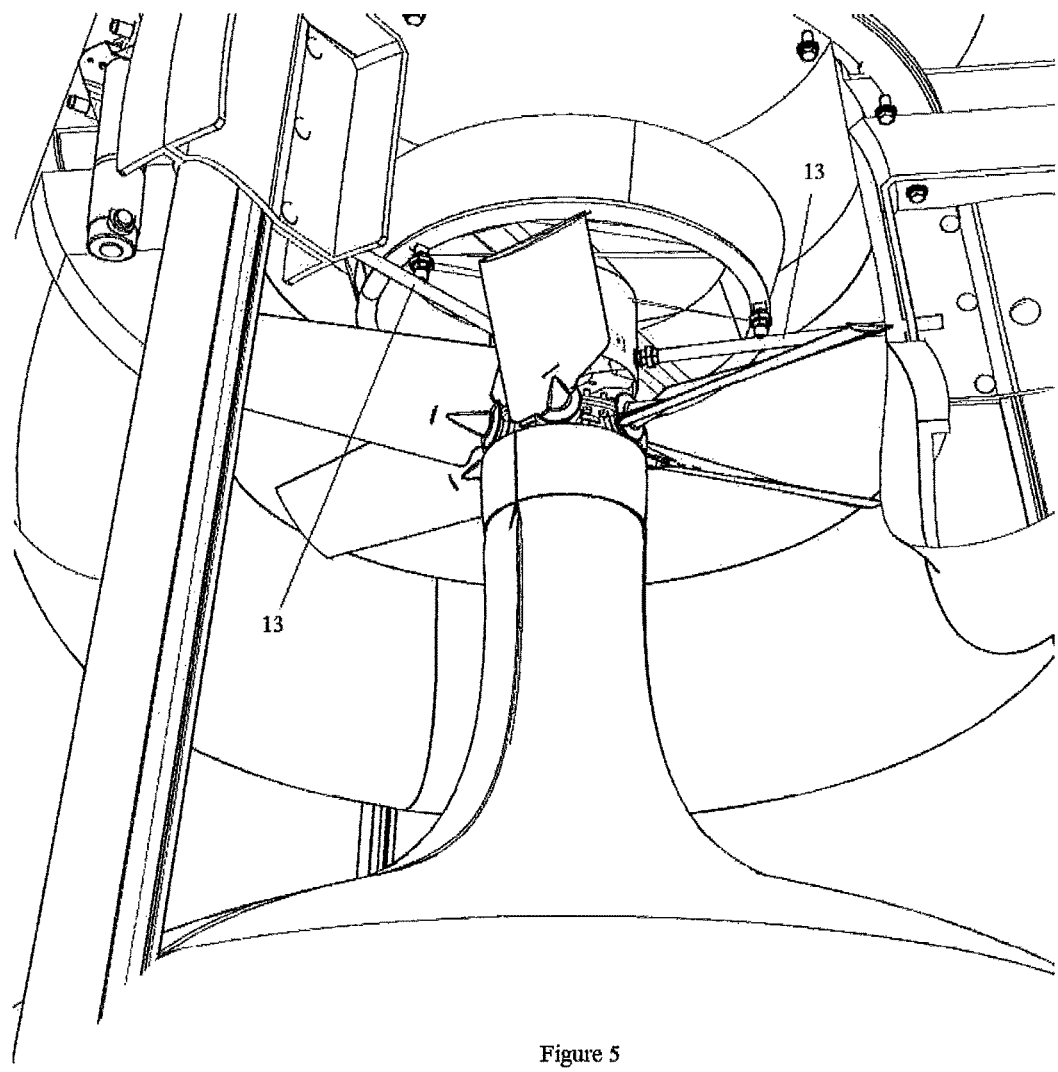
FIG. 5 shows an enlarged cut away section view of a set of mounting arms integrated into the heat distribution apparatus of FIG. 1.
Figure 6:
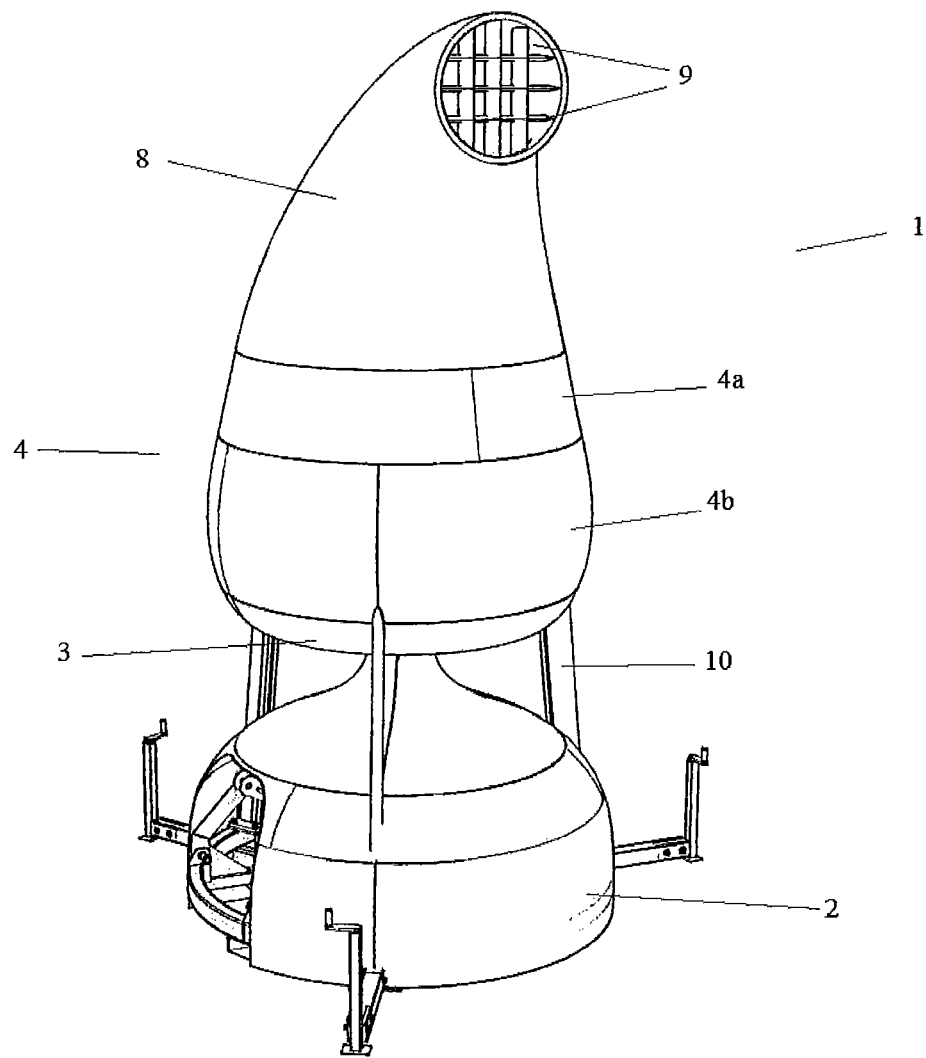

FIGS. 1 through 6 shows a series of views of a heat distribution apparatus as provided in accordance with one exemplary embodiment of the invention. FIGS. 1 through 5 show a series of cut away, cross section and enlarged views illustrating internal components of the apparatus, with FIG. 6 showing an exterior perspective view of the apparatus.

The heat distribution apparatus 1 includes a base 2 which defines an inlet stage 3. The inlet stage provides a low turbulence form used to provide air to the elevated components of the invention. In the embodiment shown the base defines a flat horizontal under surface for the apparatus 1 providing it with a stable seat on a patch of ground.

Attached directly on top of the inlet stage 3 is a mixing stage 4. The mixing stage defines an upper mixing stage 4a and a lower mixing stage 4b. The mixing stage also defines an internal mixing chamber 5 which encloses and locates a heating element in the form of a gas burner ring 6. In other embodiments the heating element may be liquid fuelled.

The increasing width or diameter of the mixing chamber as it extends from the inlet stage 3 works to slow down air flows which maximises heat transfer times and heat distribution as air travels the air flow path defined by the mixing stage.

The mixing chamber 5 also encloses and locates an impeller 7 below the gas burner ring 6. This positioning of the impeller ensures that it works as efficiently as possible, driving against the cooler inlet stage air instead of hot air in the vicinity of the gas burner ring 6.

The apparatus 1 extends upwards to and terminates in a single nozzle 8. The nozzle 8 receives evenly mixed heated air from the upper region of the mixing chamber 5. The airflow passage defined by the nozzle narrows as it extends upwards and then laterally from the base 2. This characteristic of the nozzle 8 accelerates heated air and exhausts it to the side of the apparatus 1.

The nozzle also incorporates a series of flow stabilization fins 9 adjacent to the outlet of the nozzles. These fins act to stabilize the flow of air exiting the nozzle.

Figure 3:
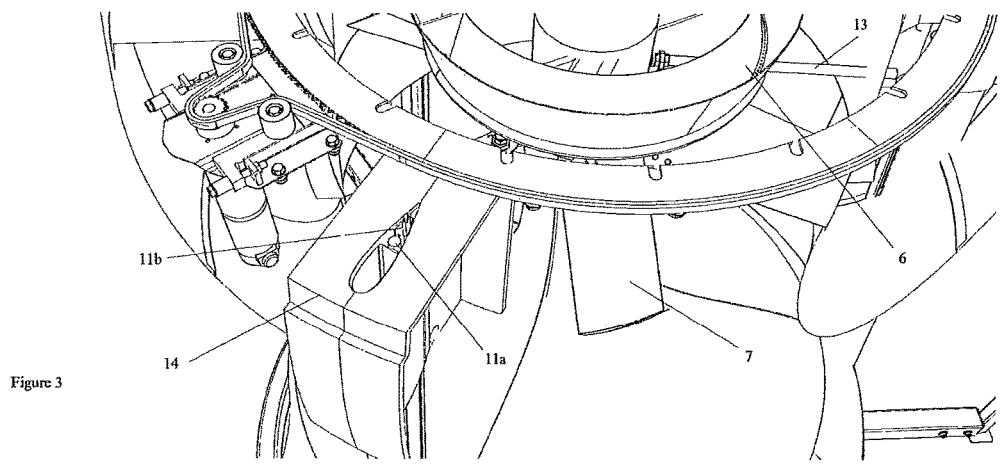
FIG. 3 shows an enlarged cut away section view of utility supply lines integrated into the heat distribution apparatus of FIG. 1.

The base includes a set of three support legs 10 which have an aerofoil shape or profile. In particular, FIG. 3 illustrates the aerofoil profile of the terminal end of each leg projecting to the top of a mixing chamber leg mounting bracket 14.

Each support leg 10 is hollow and acts as a conduit for utility supply lines in the form of a gas supply line 11a and an electrical current supply line 11b.

As illustrated by FIG. 4 the apparatus 1 also includes a drive system 12 engaged with the upper mixing stage 4a. The drive system is used to rotate the upper mixing stage 4a and nozzle 8 relative to the lower mixing stage 4b and the remaining components of the apparatus. The drive system includes a controller, motor and drive shaft 12a which operate to rotate a drive belt 12b engaged with a drive gear 12c fixed to the upper mixing stage 4b.

The underside perspective view provided by FIG. 5 also illustrates the provision of a set of mounting arms 13. In the embodiment shown three mounting arms are used to mount the gas burner ring 6 to the lower mixing stage 4b. Each mount arm is also hollow and serves as a conduit to supply combustion fuel gas from the support leg gas supply lines 11a to the gas burner ring 6.

In operation the apparatus 1 draws in cool ground level air through the inlet stage. This cool air is driven upwards into the mixing chamber by the impeller where it is heated and subsequently exhausted laterally by the nozzle 8. The nozzle 8 is rotated by the drive system 12, projecting an exhaust plume of heated air in an elevated layer above the base 2.

Figure 7:
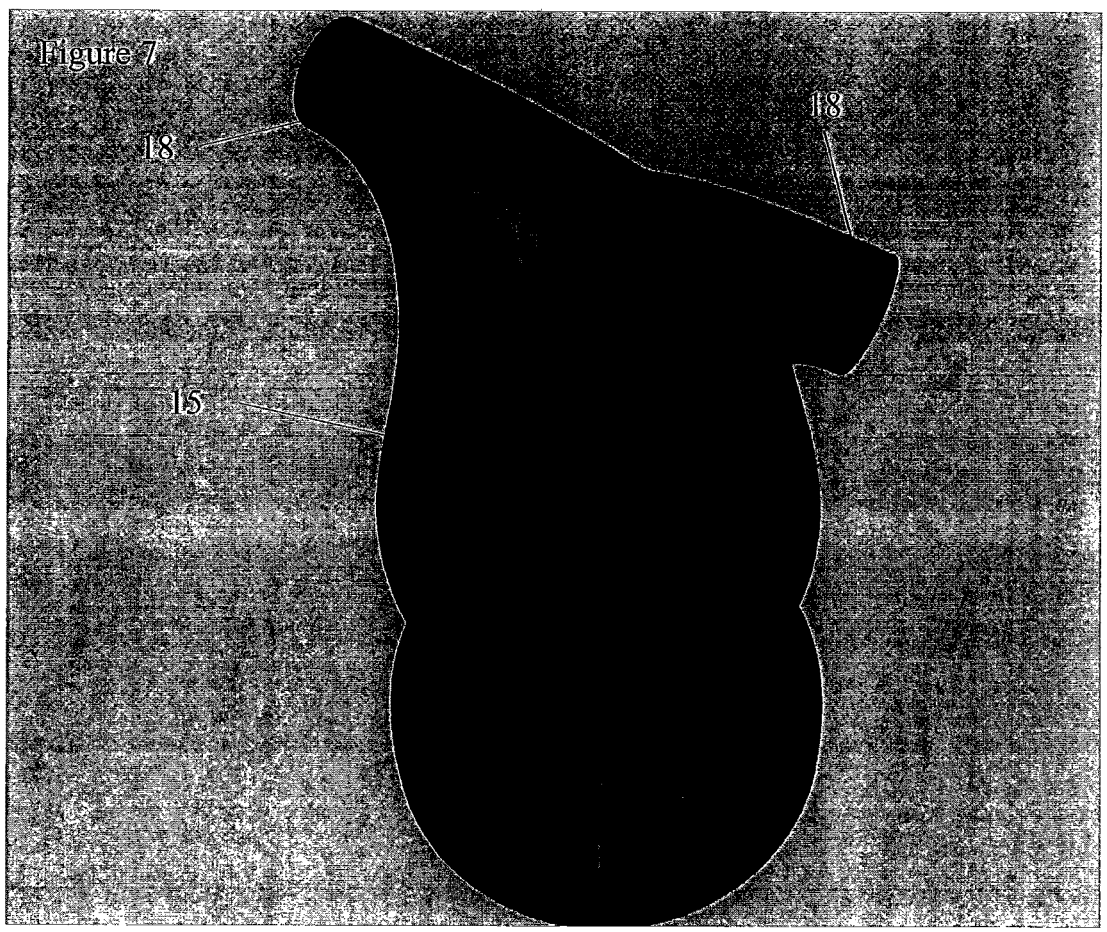
FIG. 7 shows a side view of a heat distribution apparatus with two opposed nozzles as provided in a further embodiment.

In various embodiments where the apparatus 1 is used in an orchard the nozzle 8 is positioned so as to exhaust heated air above the canopy of the orchard. In the embodiment shown the height of the centre of the plume is typically 4m, but can be varied depending on the crop being protected FIG. 7 shows an alternative embodiment of the invention with essentially the same features as that discussed with respect to FIG. 1A, other than the upper region of the mixing chamber 15 defining two opposed nozzles 18. These nozzles are arranged to generate a reaction force when exhausting hot air to assist in the rotation of the upper region of the mixing chamber.

The reaction forces generated by these two opposed nozzles and the balancing of the weight of material used to form them allows the upper region of the mixing chamber to be rotated at slower speeds and still achieve a suitable return period.

Figure 8:
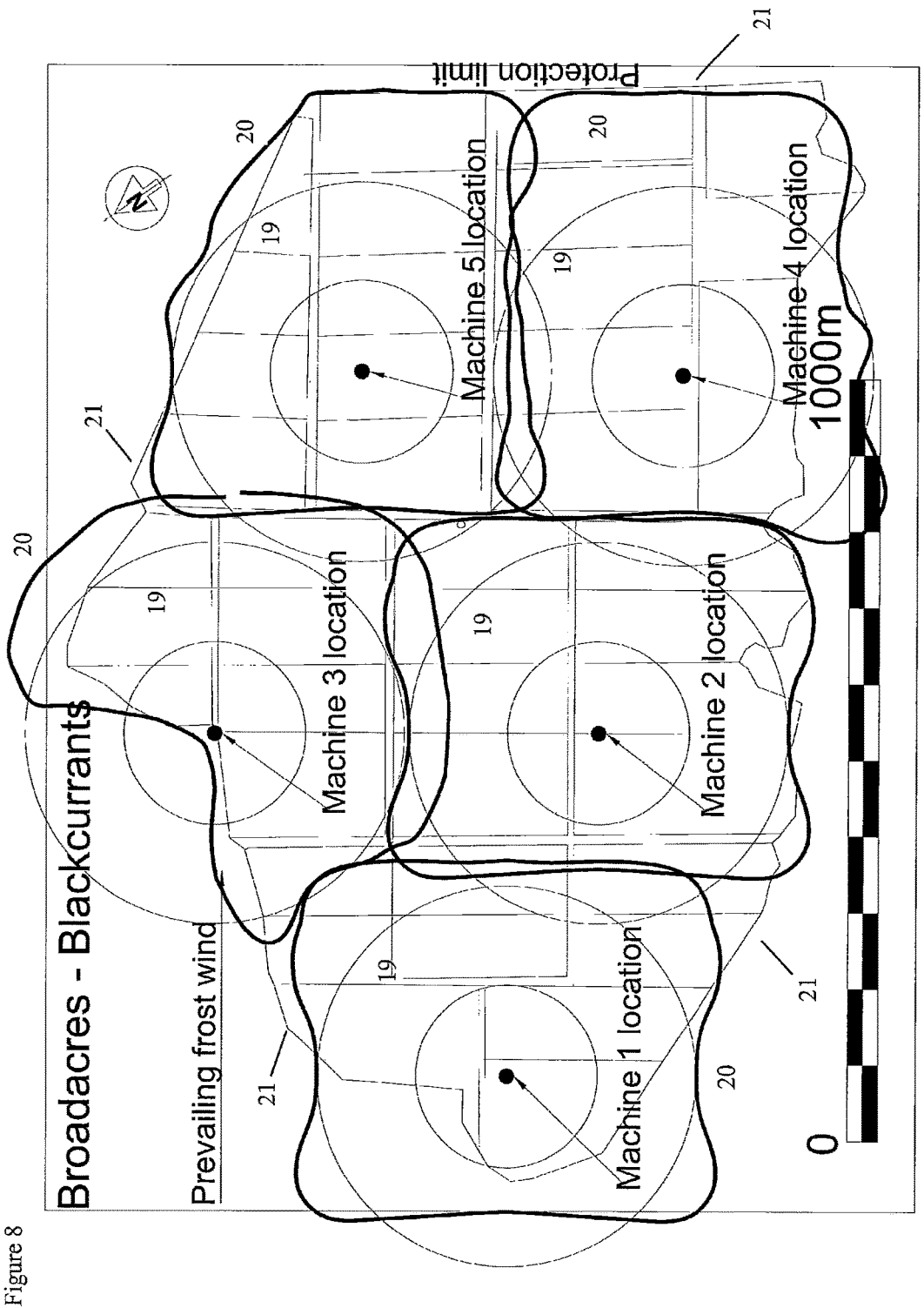
FIG. 8 shows an example plan of an area to be heated and the location of a number of heat distribution apparatus.

FIG. 8 shows an example plan of an area to be heated and the location of a number of heat distribution apparatus.

Figure 1:
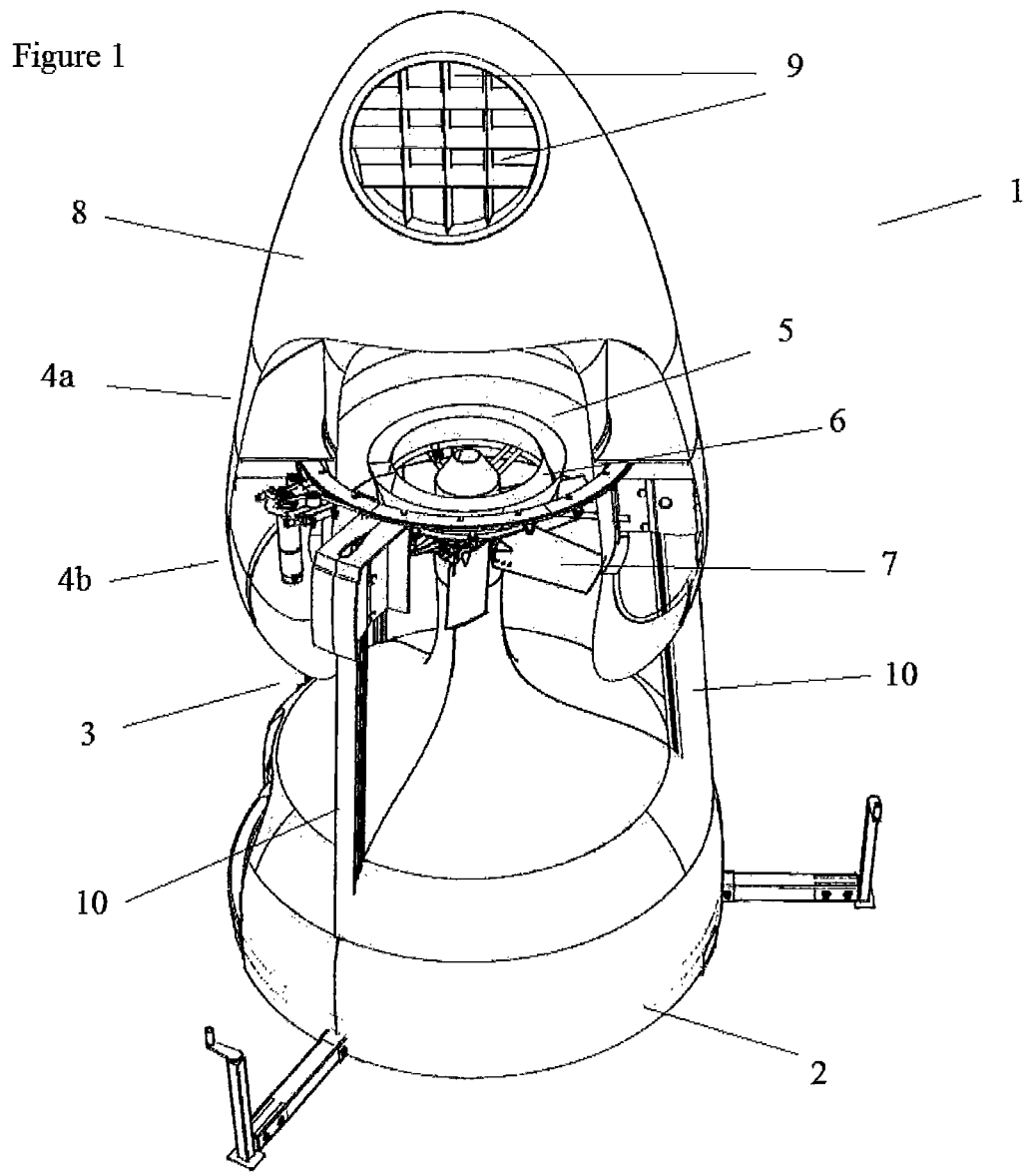
FIG. 1 shows a front cut away section view of a heat distribution apparatus with a single nozzle as provided in one embodiment.
Figure 2:
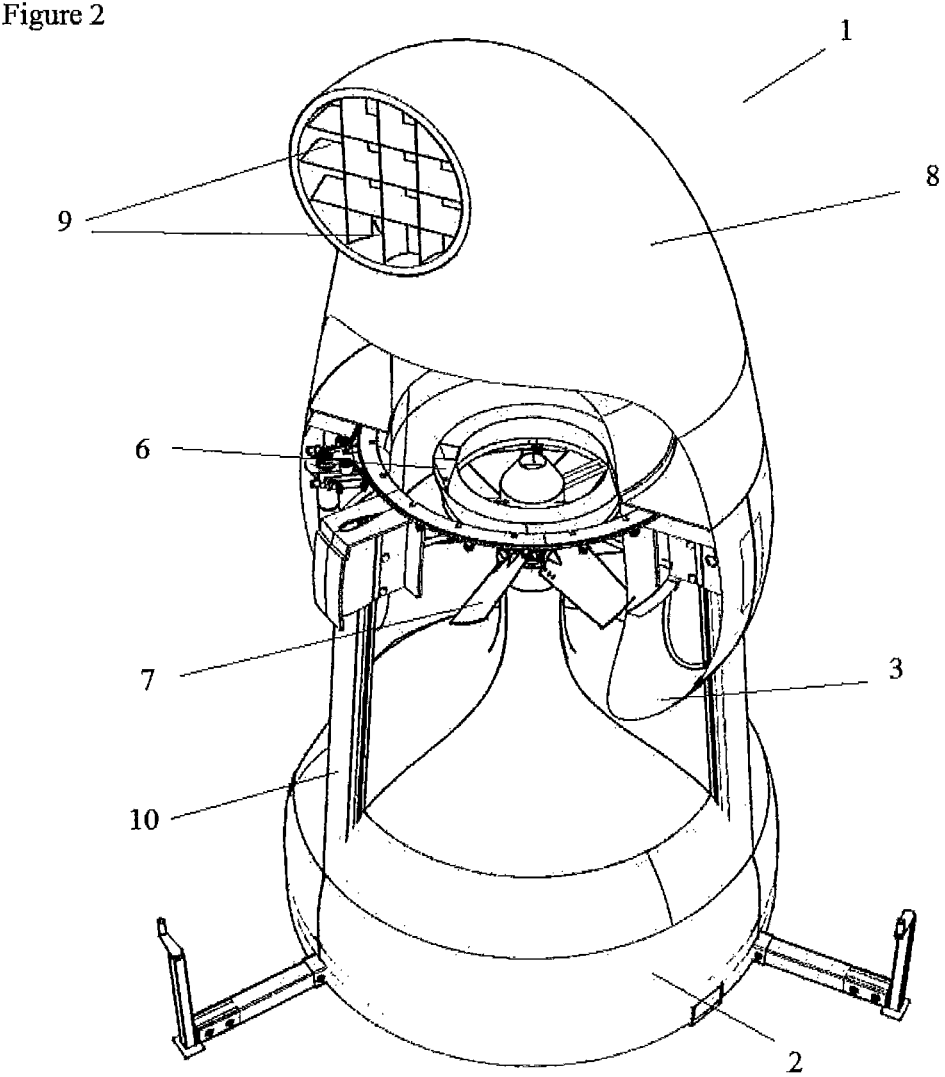
FIG. 2 shows a side cut away section view of the heat distribution apparatus of FIG. 1.

In the situation shown with respect to FIG. 2, five units of the apparatus or machines are deployed to distribute heated air over the area of a blackcurrant orchard. Machine 3 is implemented in accordance with the embodiment of FIG. 10, with the remaining machines being provided by the embodiment of FIGS. 1-9.

In the situation shown the controlling microprocessor of each machine operates to rotate the nozzles of these machines through a 360° range of motion. The theoretical distribution pattern of air generated by each machine is shown by circular track 19.

FIG. 8 also shows the actual distribution pattern 20 of heated air for each machine. As can be seen in this figure five separate heating machines are able to adequately cover all boundaries 21 of the blackcurrant orchard with heated air. Each heating machine is used to exhaust a plume of heated air just above the canopy of the orchard, providing a protective warm air blanket for the orchard against frost damage.

In the preceding description and the following claims the word "comprise" or equivalent variations thereof is used in an inclusive sense to specify the presence of the stated feature or features. This term does not preclude the presence or addition of further features in various embodiments.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What we claim is:

1. A heating apparatus adapted to modify local climatic conditions, said heating apparatus comprising
   a base arranged to support the heating apparatus on a support surface,
   an inlet stage associated with the base,
   a mixer stage connected on top of the inlet stage,
   at least one outlet nozzle connected to the mixer stage, said at least one outlet nozzle being adapted to rotate relative to the base,
   at least one heating element formed from a hydrocarbon gas burner located inside the mixer stage for vertical flow of heated air, and
   an impeller arranged to drive air through the inlet stage into the mixer stage and out at least one outlet nozzle, said impeller being located adjacent to the inlet stage and below said at least one heating element, the at least one outlet nozzle including a plurality of flow stabilization fins located adjacent to an outlet of the at least one outlet nozzle for stabilizing airflow as the heated air exits horizontally through the at least one nozzle,
   wherein the mixer stage defines an air flow path which elevates air drawn through the mixer stage.

2. A heating apparatus as claimed in claim 1 wherein the base defines a plurality of support legs.

3. A heating apparatus as claimed in claim 2 wherein at least one support leg includes hollow portions which enclose at least one utility supply line.

4. A heating apparatus as claimed in claim 3 wherein a support leg encloses a heating element fuel supply line.

5. A heating apparatus as claimed in claim 3 wherein a support leg encloses an electricity supply line.

6. A heating apparatus as claimed in claim 2 wherein exterior surfaces of the support legs define airfoil forms.

7. A heating apparatus as claimed in claim 2 wherein the length of each of the support legs can be dynamically adjusted.

8. A heating apparatus as claimed in claim 1 wherein a heating element is formed from a hydrocarbon gas burner which defines a ring shape with a plurality of gas outlets deployed along the perimeter of the ring.

9. A heating apparatus as claimed in claim 1 wherein a heater element is located centrally inside the bottom section of the mixer stage.

10. A heating apparatus as claimed in claim 1 which includes a plurality of mounting arms used to mount a heater element within the mixer stage, at least one mounting arm enclosing a supply fuel line connected to the heating element.

11. A heating apparatus as claimed in claim 1 wherein the outlet nozzle projects upwards from an upper region of the mixer stage and terminates in an elbow section or T section configured to distribute heated air laterally away from the top of the heating apparatus.

12. A heating apparatus as claimed in claim 1 which includes a drive system configured to rotate said at least one outlet nozzle.

13. A heating apparatus as claimed in claim 1 wherein the inlet stage is fixed to the base and defines one or more apertures used to draw air into the upper mixer stage.

14. A heating apparatus as claimed in claim 1 which includes a controller arranged to issue control signals to modify the behavior of the heating apparatus.

15. A heating apparatus as claimed in claim 14 wherein the controller is used to adjust the rate of rotation of an outlet nozzle.

16. A heating apparatus as claimed in claim 14 wherein the controller is used to adjust the heat output of the heating element.

17. A heating apparatus as claimed in claim 14 wherein the controller is used to dynamically adjust the length of at least one support leg used to form the base.

* * * * *